(12) United States Patent
Lorts

(10) Patent No.: US 8,935,078 B1
(45) Date of Patent: Jan. 13, 2015

(54) HYDRAULIC SERVO GAS REGULATOR FOR MULTI-FUEL ENGINE

(75) Inventor: Anthony Richard Lorts, Sarasota, FL (US)

(73) Assignee: Anthony Richard Lorts, West Bloomfield, MI (US)

( * ) Notice: Subject to any disclaimer, the term of this patent is extended or adjusted under 35 U.S.C. 154(b) by 284 days.

(21) Appl. No.: 13/374,810

(22) Filed: Jan. 14, 2012

(51) Int. Cl.
*F02M 69/54* (2006.01)
*F02M 21/02* (2006.01)

(52) U.S. Cl.
CPC ............... *F02M 69/54* (2013.01); *F02M 21/02* (2013.01)
USPC .......................................... 701/104; 123/457

(58) Field of Classification Search
CPC . F02B 69/04; F02D 19/0642; F02D 19/0644; F02D 19/0647; F02D 19/08; F02D 19/081
USPC .......... 701/102, 103, 104, 112; 123/575–578, 123/299, 300, 304, 456, 27 GE, 525, 457, 123/458, 461, 462, 463, 526, 1 A
See application file for complete search history.

(56) References Cited

U.S. PATENT DOCUMENTS

| | | | |
|---|---|---|---|
| 3,688,754 A * | 9/1972 | Eckert et al. ................... 123/505 |
| 3,951,121 A * | 4/1976 | Passera et al. ................. 123/458 |
| 4,038,956 A * | 8/1977 | Perr et al. ....................... 123/506 |
| 4,394,856 A * | 7/1983 | Smith et al. .................... 123/506 |
| 5,367,999 A | 11/1994 | King |
| 5,522,369 A | 6/1996 | Povinger |
| 5,771,857 A | 6/1998 | Willi |
| 6,227,171 B1 * | 5/2001 | Matsuda ......................... 123/458 |
| 6,298,833 B1 | 10/2001 | Douville |
| 6,626,150 B2 | 9/2003 | Palma |
| 6,701,905 B1 | 3/2004 | Gaskins |
| 7,140,354 B1 | 11/2006 | Hashemi |
| 7,178,335 B2 | 2/2007 | Bickley |
| 7,308,889 B2 | 12/2007 | Post et al. |
| 7,463,967 B2 | 12/2008 | Ancimer |
| 7,624,720 B1 | 12/2009 | Dokas |
| 7,661,409 B2 | 2/2010 | Schule |
| 7,922,833 B2 | 4/2011 | McMahon |
| 8,096,522 B2 | 1/2012 | Bachmaier |

FOREIGN PATENT DOCUMENTS

CA               1203132          4/1986

\* cited by examiner

*Primary Examiner* — Mahmoud Gimie
(74) *Attorney, Agent, or Firm* — Warn Partners, P.C.

(57) ABSTRACT

A bi-fuel and dual-fuel engine variable pressure fuel system is presented facilitating individual or simultaneous use of liquid and gaseous fuels including natural gas and gasoline, through employment of a variable output pressure gaseous fuel regulator incorporating an attached hydraulic amplifying structure communicating with a relatively low pressure hydraulic servo circuit that may in turn communicate with a variable pressure automotive liquid fuel system to facilitate relatively high pressure gaseous fuel injection.

14 Claims, 3 Drawing Sheets

HYDRAULIC SERVO GAS REGULATOR FOR MULTI-FUEL ENGINE

TECHNICAL FIELD AND BACKGROUND

This invention is applicable to bi-fuel and dual-fuel internal combustion engines that utilize gaseous and liquid fuels either simultaneously or individually. It is aimed at dealing with the limited response characteristics of high pressure solenoid type gaseous fuel injectors when activated by present 12 volt petrol (gasoline) engine control units (ECU's,) where the injectors are synchronized to the speed, or RPM of the engine. To compensate for the larger volumes of gaseous fuel required to deliver the equivalent energy of gasoline, gaseous (gas) injectors operate under higher pressures, with larger, heavier moving valve components as compared to petrol type injectors. This can result in minimum open/close cycle periods twice as long as those of their petrol counterparts. At low speed idle power with a static, high fuel rail pressure necessary for maximum power, the gas injector can fail to fully open in response to short ECU commanded voltage pulse widths. Minimum open cycle periods for solenoid gas injectors are typically around 4 milliseconds. At idle with a static gas fuel rail pressure that can meet the engines full operating power range, the ECU may command an injector open pulse width far less than 4 milliseconds. The injector may thus fail to respond fast enough to these short open signals, resulting in inconsistent fuel delivery, roughness and excessive emissions.

Where fuel injectors are typically synchronized by the ECU to cycle with engine RPM, low engine speeds allow more time for the injector to more accurately meter fuel. By lowering fuel supply pressure at idle speeds the injector can remain open longer, allowing more accurate response to the ECU. However when fuel demand increases with speed and the available injector cycle time decreases, a variably higher pressure fuel rail supply then becomes necessary to avoid fuel starvation.

SUMMARY

The operating limitations of solenoid actuated gas injector valves are overcome here by proportionately raising and lowering fuel injector rail pressure with engine speed and load. Longer "open" voltage pulse width commands at low speeds are made possible with lower fuel supply pressures, allowing the injector to deliver small gas quantities per cycle with greater accuracy, while high fuel rail supply pressures are available at maximum speed and load. A means of controlling fuel flow through statically open gaseous injectors is also made possible through a precisely controlled variable pressure injector rail supply responsive to engine speed and load.

The present invention eliminates the typical load spring that acts upon the pressure sensing element (usually a piston or flexible diaphragm attached to a flow control valve,) within a gas regulator to control output pressure, and replaces it with a variable hydraulic pressure amplifying actuator attached to the regulator body, henceforth referred to here as a "hydraulic amp." The regulator represented here is of the piston sensing type, similar to the CNG (compressed natural gas) regulators presently made by Tescom, of Elk River, Minn.

Within the hydraulic amp of the present invention is a hydraulic pressure sensing piston and contiguous pushrod structure referred to henceforth as a "piston-pushrod." This spool-like structure has a relatively large pressure sensing piston crown surface at the "piston" end, and a smaller surface at the opposite "pushrod" end that abuts the gas regulator's pressure sensing element on a seating area normally acted upon by the load spring. This piston-pushrod structure reciprocates within the hydraulic amp in response to pressure exerted on its' piston crown by a variable pressure hydraulic servo circuit, which in the illustrated embodiment is comprised of a communicating gasoline or diesel liquid fuel supply system having an electric or engine driven fuel or "lift" pump. Alternately, other sources of hydraulic servo pressure may be derived from vehicle systems such as a windshield washer fluid system that uses a methanol/water solution. One or more variable flow controlling devices within the hydraulic servo circuit may include a variable flow control valve and a typical fuel pressure regulator, in order to variably restrict flow and create variable backpressure that is sensed by the communicating hydraulic amp. An engine control unit (ECU) or separate computers may control servo pressure by sending variable voltages to the fuel pump and variable flow servo control devices in response to engine fuel demand parameters related to speed and load such as manifold absolute pressure (MAP), RPM, and operator power demand. Variable backpressure in the present embodiment caused by a fuel pump working against the servo flow control devices results in a variable servo pressure of approximately 12 to 40 psig. Servo pressure acting within the hydraulic amp acting upon the piston-pushrod transmits an amplified control force to the contacting pressure sensing element (piston) within the gas regulator. The flow control valve within the gas regulator attached to the sensing piston variably reciprocates upon a closeable orifice positioned between the regulator's gas inflow and outflow conduits and meters outflowing gas pressure in response to control pressure exerted by the piston-pushrod. The high pressure gaseous fuel supply is thereby reduced to a variably lower injector rail pressure. Gas regulator outflow pressure is multiplied over that of the servo pressure by a factor determined by the difference in diameters between the hydraulic pressure sensing crown of the piston-pushrod within the amp, and the smaller abutting gas pressure sensing piston within the regulator.

Throttle by Wire

Because typical air inlet throttle mechanisms respond to transient power commands faster than can variable output pressure gas regulators due to gas compressibility, air inlet throttle mechanisms can thus track and respond to servo commanded gas regulator output pressure changes faster than can variable output pressure gas regulators track and respond to commanded air throttle induced MAP pressure changes. In one embodiment of the present invention especially applicable to engines operating within narrow air/fuel ratio limits, a "throttle by wire" system having an intake throttle valve operable in response to variable gas injector rail pressure may be employed to counter compressibility induced rail pressure lag during rapid power changes.

More precise air/fuel ratio control may therefore be obtained in the present embodiment through employment of a pneumatic or electrically actuated throttle mechanism that responds to operator commanded variable pressure within the gas injector rail. Power output in the present invention thus may be controlled by a "gas pedal" that actuates the variable hydraulic flow and pressure controlling components within the servo circuit such as a variable flow hydraulic valve, that in turn control amplified gas regulator output and injector rail pressure. Variable gas rail pressure can then operate a pneumatically actuated throttle valve, or be sensed by a throttle controlling ECU which may then in turn proportionately actuate a motorized throttle valve.

Injector/Cylinder Deactivation

In multi injector configurations of the present invention, transient fuel rail pressure imbalances resulting from rapid power changes may be countered by employing a ECU injector or injector/cylinder cut off circuit. This circuit may contain a map that defines an injector operating envelope determined by RPM, fuel rail pressure and minimum pulse width. When fuel rail pressures exceed the injector's minimum pulse width, such as may occur when the operator rapidly lifts off of a fully depressed gas pedal with maximum fuel rail pressure, the ECU may deactivate one or more injectors (and cylinders,) causing the remaining injectors to operate at higher loads with longer pulse widths. When engine load and intake air flow increase, or fuel rail pressure decreases to points within the injector operating envelope, the idle injectors may then be progressively reactivated allowing continuously optimal injector operation and precise air/fuel ratio control.

Advantages

Droop and Supply Pressure Effect

By eliminating the "load spring" in a typical gas pressure regulator, the present hydraulic amp embodiment serves to eliminate output pressure drop or "droop" that occurs when the pressure exerted by the spring on the sensing element decays as the attached pressure sensing piston opens the flow control valve. Output pressure thus declines as gas flow demand increases with a typical gas regulator governed by a load control spring.

The total force required to open a closed, unbalanced gas regulator flow control valve must exceed the force exerted upon the valve head by the upstream tank supply pressure plus the force that the out flowing gas pressure exerts upon the pressure sensing piston. When pressure on the inlet (tank) side of the valve falls with fuel consumption, the total force holding the valve closed decreases. Thus, the total force required to open the valve is reduced as the upstream supply tank pressure falls as fuel is consumed. For a conventional gas regulator with a fixed output controlling load spring, the output pressure to the fuel rail will increase as supply tank pressure decreases. To maintain a constant regulator outflow pressure, the controlling pressure exerted on the load or control side of the regulator sensing piston must be reduced as supply tank pressure decreases. By replacing the common regulator load spring with the present servo pressure actuated hydraulic amp controlled by an ECU having input from an upstream pressure sensor such as a fuel tank quantity gauge, the present invention can maintain consistent outflow pressures independent of falling tank pressure, and eliminate droop associated with a regulator load spring.

Expanded Range, Fewer Components, Safety

The wide range of controllable gas regulator output pressures (approximately 30 to over 95 psig in this iteration) made possible by the present servo controlled hydraulic amp expands the limited operating bandwidth of solenoid gas injectors. By lowering rail pressure at reduced engine speeds and loads, more accurate metering, lower injector noise and reduced power consumption is attained. Conversely, as RPM increases and the available injector open time per cycle decreases, the present invention increases injector rail pressure with increasing engine speed and fuel demand, increasing fuel flow through injectors that eventually may remain statically open at maximum engine speeds. Employed in a throttle body injection (TBI) configuration, the present variable gas rail pressure invention facilitates the utilization of fewer gas injectors, verses employing a plurality of injectors staged to operate over a wide load and speed range with a constant rail pressure By replacing the regulator load spring in a gas regulator with the present hydraulic servo pressure controlled amp, when the engine and hydraulic servo pump stop, servo pressure bleeds down and residual gas rail pressure acts unopposed against the regulator's sensing piston to close the regulator flow control valve. Gas flow to the injectors is then blocked, reducing potential gas leakage through the injectors and the need for a shut off valve typically placed in the conduit running between the regulator and the injector rail.

A safety advantage over common dome loaded regulators that have a load or servo control fluid applied directly to the regulator pressure sensing element occurs whereby the servo fluid and communicating vehicle fuel system of the present invention are protected from high pressure gas incursion from a damaged gas regulator sensing element by the present hydraulic amp.

RELATED PRIOR ART

A variable pressure gas rail injector pressure means is described by Willi in U.S. Pat. No. 5,771,857, as applied to direct injection, glow ignited natural gas engines. Here variable gas rail pressure is generated by an electronically modulated diesel injection pump that applies high pressure diesel fuel to the control side of a dome loaded regulator to produce correspondingly high, unamplified variable gas injection near TDC to optimize variable pressure direct injection.

Laing and Prichard in Canadian patent CA1203132 describe a duel fuel diesel engine, utilizing variably reduced hydraulic pressure in a servo circuit bled from the diesel injection pump and controlled by a centrifugal governor which variably pressurizes the control or load chamber of a gas regulator with diesel fuel in typical dome load fashion, to provide variable gas fuel pressure to a diesel engine air intake.

Bickley in U.S. Pat. No. 7,178,335 describes a spool valve hydraulic pressure regulator with variable output pressure controlled by a hydraulic load chamber augmented by an internal load spring whose compressive force is varied by an abutting moveable piston adjustable by means of a separate hydraulic actuating chamber contiguous with the end of the piston opposite the spring.

McMahon and O'Halloran in U.S. Pat. No. 7,922,833 describe an invention utilizing a hydraulic cylinder attached to a gas regulator that contains a piston displaceable against a point on a flexible regulator pressure sensing diaphragm for the purpose of varying the tension within the diaphragm in order to vary the pressure of the outflowing gas flowing into a deburring thermal energy machine (TEM.) Variable regulator outflow pressure is here determined by varying the tension of the flexible diaphragm, as opposed to the present invention, where variable hydraulic servo pressure acting through an amplifying piston-pushrod structure upon a regulator pressure sensing piston is the regulator load controlling element as opposed to variable tension within a regulator sensing diaphragm.

Multiple variable pressure regulator control means including pneumatic, hydraulic, mechanical, electric and electro-hydraulic are cited in the ECU controlled variable gas pressure system of King in U.S. Pat. No. 5,367,999. A detailed description is provided describing a variable pressure pneumatic regulator actuator embodiment in this specification, but only general reference is made to other variable hydraulic pressure regulator biasing means in the claims, with no details provided in the specification.

Douville, Noble, Baker, Tran and Touchette describe a dual fuel diesel direct injection system in U.S. Pat. No. 6,298,833 having one injector that injects both a gaseous main charge and a diesel fuel pilot ignition charge into the engine cylinder, and where a dome loaded regulator directly senses diesel pilot injector fuel pressure, and regulates the main gaseous fuel charge at an equal or slightly lower output pressure, to maintain a positive seal between the gas and liquid fuels within the injector.

Post and Brook in Pub. No. US2006/0213488 A1 describe a variable pressure direct gas injection system that includes a hydraulic dome loaded regulator that contains a spring biased flow control valve where the hydraulic load fluid acts against the bias spring to vary gas injector fuel pressure (in a manner similar to McMahon and O'Halloran.) The hydraulic load fluid may consist of diesel pilot fuel and here is always approximately equal to or higher than the regulator outflow gas pressure to avoid gas leakage into the diesel load control fluid.

Ancimer, Batenburg and Thompson in U.S. Pat. No. 7,463,967 present a variable pressure, direct supersonic gas injection control system utilizing a single injector for both the diesel pilot and the main gaseous fuels. This also includes a dome loaded regulator that maintains almost equal pressure within the gas and the liquid portions of the injector to insure an effective seal between the two fluids.

Palma in U.S. Pat. No. 6,626,150 and Dokas, Pyle and Yu in U.S. Pat. No. 7,624,720 describe electromagnetically controlled gasoline type regulators.

Hashemi in U.S. Pat. No. 7,140,354 reveals a means for depressurizing a gaseous fuel injector supply rail with a pump that pumps excess gas from the fuel rail back upstream into either the gas supply tank or to a point upstream of one of the pressure reducing regulators that feed the fuel rail. This pumping means is controlled by an ECU for the purpose of maintaining rail pressures compatible with the operating characteristics of gaseous fuel injectors.

My invention, can be differentiated from prior art by its' ability to safely utilize low pressure, volatile spark ignitable fuels as a hydraulic regulator servo pressure fluid to produce an amplified, high pressure fuel supply from a gas regulator. The present servo amplifying means differs from conventional dome loaded regulators in that the pressurized servo fluid is mechanically isolated and amplified by means of the piston-pushrod structure, which moves to block orifices in the present hydraulic amp communicating with the vehicle fuel system in response to a high pressure leak from the gas regulator.

The presently described electronic cylinder cutoff and fuel pressure sensing throttle control means obviate the need for the pump dependent, high pressure fuel rail de-pressurizing means described in Hashemi.

DRAWINGS

DETAILED DESCRIPTION

Figure 1:
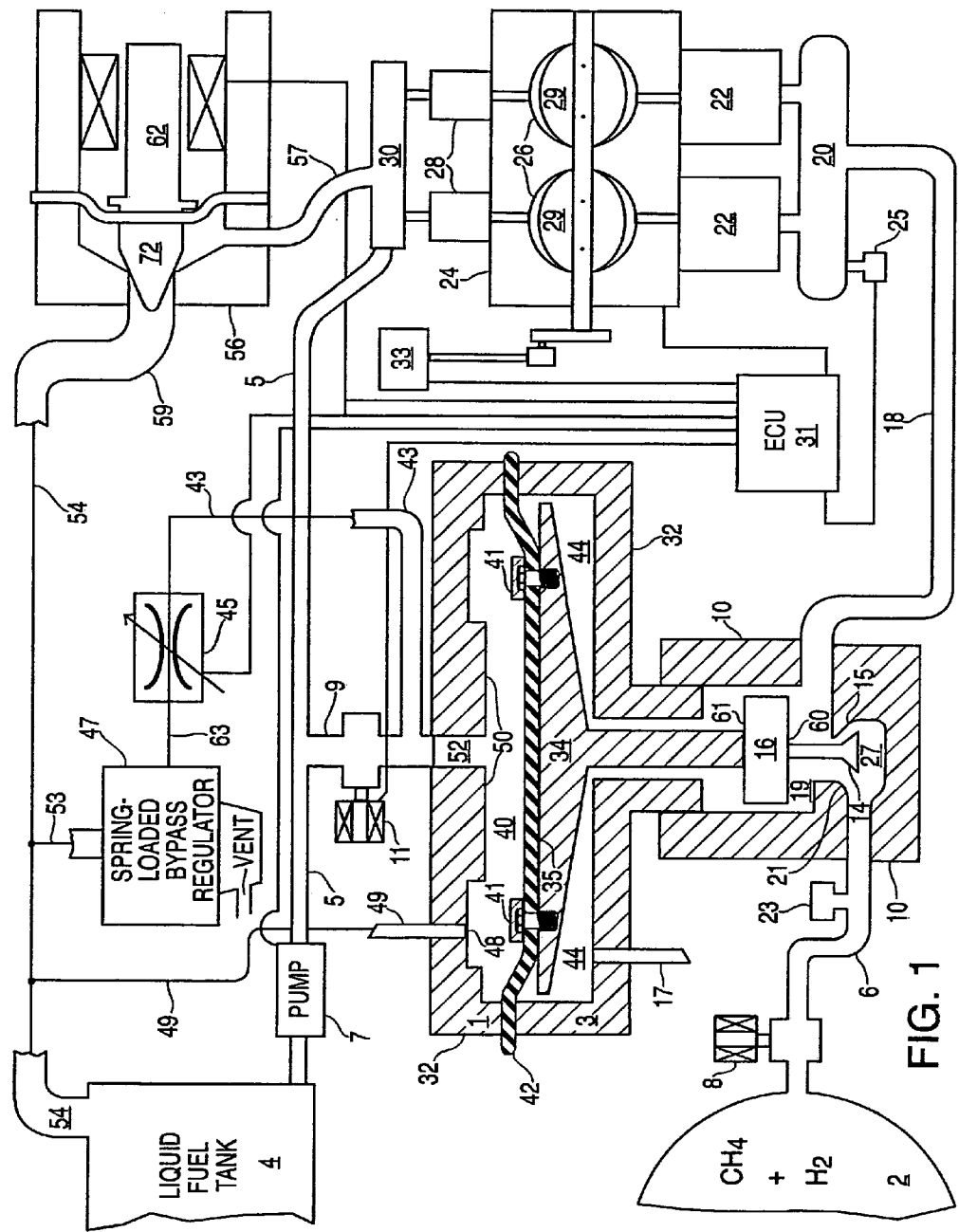
FIG. 1 is a detailed schematic of the present invention employed in a bi or dual-fuel throttle body injector fuel induction system.

FIG. 1 shows a cross sectional representation of the present invention where gaseous and liquid fuels may be injected into the air inlet of an engine at throttle body 24.

Gaseous fuel tank 2 may hold fuels such as natural gas and hydrogen at pressures currently averaging 3600 psig or higher. Liquid tank 4 may hold fuels such as gasoline, alcohol or diesel. Tank 4 supplies variable output fuel pump 7, which may be electrically or engine driven. Pump 7 supplies petrol injectors 28 within throttle body 24 through fuel line 5 and fuel rail 30. Throttle body 24 is represented here with two throttle bores 26 having typical shaft mounted throttle valves 29. Gaseous injectors 22 are mounted opposite liquid injectors 28 in throttle body 24. Either a gaseous or a liquid fuel can alternately be injected at throttle body 24 through either gas injectors 22 or liquid ("petrol") injectors 28 in a "bi-fuel" application of the embodiment. In a "dual-fuel" mode, gaseous and liquid fuels may be injected simultaneously by gas injectors 22 and liquid injectors 28, such as where alcohol or an alcohol solution may be selectively injected with methane or hydrogen in a supercharged application to avoid detonation or knock.

Petrol pressure in rail 30 may be controlled by a typical spring loaded bypass regulator communicating with fuel rail 30, or by the variable pressure electromagnetic bypass regulator shown here at 56, connected to rail 30 through pipe 57. Fuel bypassed through regulator 56 returns to tank 4 from output pipe 59 through contiguous fuel return line 54. Regulator 56 may be electronically controlled to maintain petrol pressure in rail 30 in a typical throttle body or port fuel injector pressure range of approximately 15 to 75 psig.

Fuel tank 2 supplies high pressure gaseous fuel, typically stored at pressures ranging from 200 to over 3600 psig, to piston type gas regulator 10, through pipe 6. Pipe 6 contains an electromagnetic shut off valve 8, and a temperature and pressure sensor 23. Gas regulator 10 variably reduces storage tank pressure to a range of approximately 40 to 95 psig in the present embodiment to feed gaseous injectors 22 through pipe 18 and rail 20. Variable output pressure from regulator 10 is produced by means of attached hydraulic amp assembly 32 that controls regulator pressure output in place of an output governing load spring. Amp 32 is variably pressurized by liquid fuel from pump 7 communicating with internal amp pressure sensing chamber 40 through fuel lines 5 and 9. Amp 32 may have orifice 48 located near the periphery of sensing chamber 40 to allow communication between it and weep line 49, and may then be rotated to locate orifice 48 uppermost so as to allow trapped air to rise and pass out of chamber 40 through weep line 49, and into return line 54 and tank 4. Tank 4 may then be vented in a typical fashion. Line 49 is of a sufficiently small diameter so as to allow variable servo pressure to be maintained in chamber 40, while still allowing a small venting flow of fluid into return line 54.

Figure 2:
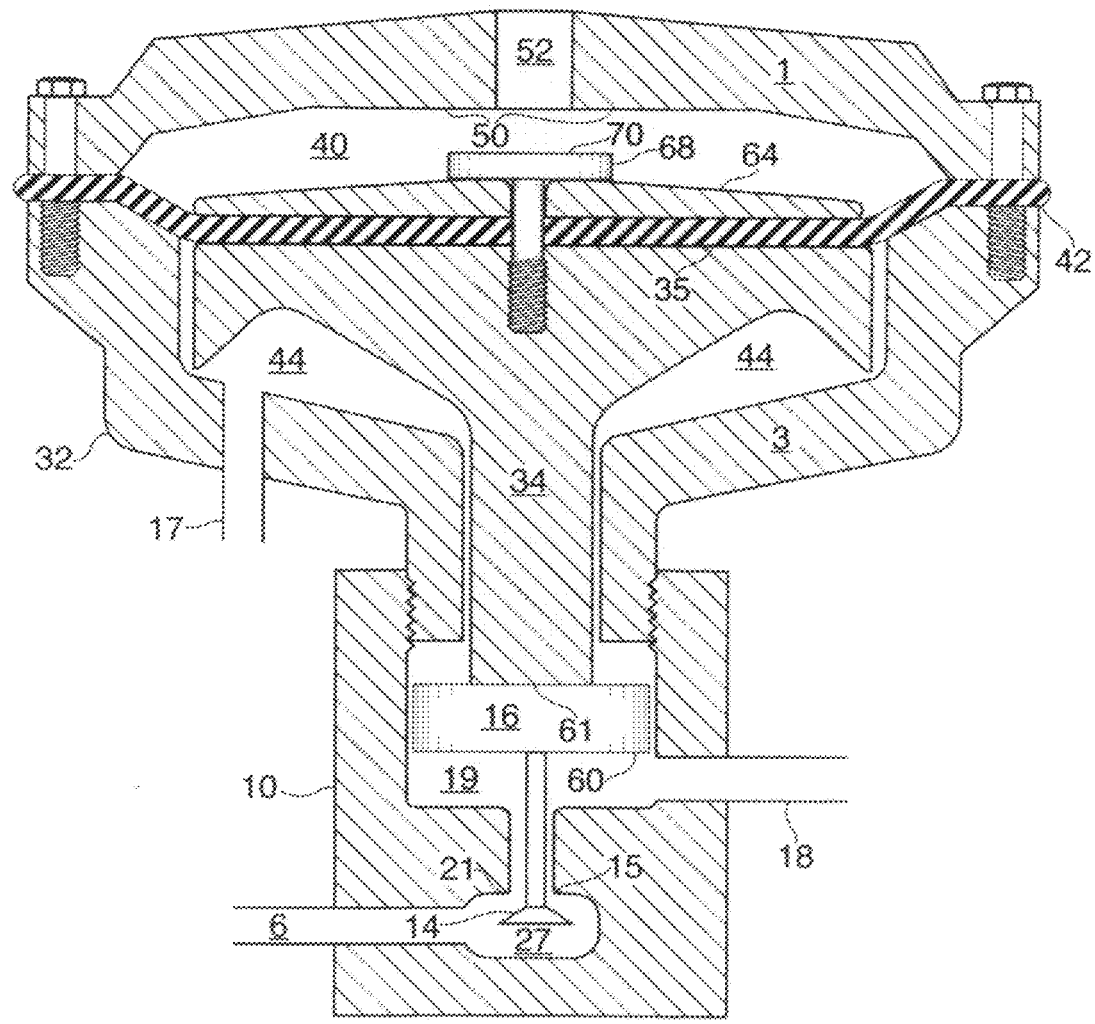
FIG. 2 is a detailed cross sectional representation of the hydraulic amp of the present invention.

Referencing FIG. 1 and FIG. 2, hydraulic fluid pressure transmitted through lines 5 and 9 through orifice 52 to chamber 40 is sensed through diaphragm 42 (here composed of 1/32 inch thick fluorosilicone rubber.) Diaphragm 42 acts to seal pressurized servo fluid within chamber 40 and transmit variable servo pressure to the piston crown 35 of piston-pushrod 34. Pressure acting upon crown 35 exerts an amplified force through piston-pushrod 34 upon the load sensing surface 61 of regulator pressure sensing piston 16. An alternative means of sealing chamber may consist of an O-ring (not shown)

placed circumferentially between crown 35 of piston-push-rod 34 and the inner adjacent surface of hydraulic amp 32. Gaseous regulator sensing piston 16 is attached to flow control valve 14, which is variably closeable upon valve seat 15. Valve 14 reciprocates upon seat 15 to control the flow of gas from inlet pipe 6 through orifice 21, into gaseous pressure sensing chamber 19 and out pipe 18. Variable output pressure from regulator 10 is determined by the reciprocation of valve 14 upon seat 15 in response to the opposing forces acting on attached regulator sensing piston 16 by the outflowing gas pressure in chamber 19 acting on piston surface 60, and the servo pressure in amp chamber 40 acting through structure 34 upon piston surface 61. Upstream supply pressure within valve head chamber 27 may act variably against valve 14 when valve 14 is on or near seat 15, and can thus add a variable closing force to that of the pressure within chamber 19. The approximate amplification factor of gas regulator output pressure to liquid servo circuit pressure is determined by the ratio of the surface area of crown 35 of structure 34 to the smaller surface area 60 of regulator piston 16. Hydraulic servo circuit pressure in the present iteration ranges from approximately 12 to 35 psig, resulting in a gas rail pressure of about 40 to 95 psig.

Hydraulic Servo Circuit

Referencing FIG. 1, variable pressure within amp chamber 40 is determined by a hydraulic servo pressure control circuit comprised here of the following communicating fuel lines and variably restrictive components: Fuel pump 7 which feeds fuel line 5 and branching line 9; line 43 branching off of line 9 beneath solenoid valve 11 communicating with variable flow control valve 45; line 63 fluidly connecting valve 45 with bypass regulator 47; and line 53 fluidly connecting regulator 47 to fuel tank return line 54. Pressure within chamber 40 can be modulated through variable activation of pump 7 and valve 45, as well as by electromagnetic regulator 56 communicating with fuel lines 5 and 9 through pipe 57 and liquid fuel injector rail 30. Bypass regulator 47 is located downstream of valve 45 in order to facilitate stable pressure within the servo circuit at minimal fluid flow, and is set to maintain a minimum servo circuit pressure of 12 psig in this embodiment. Variable flow valve 45 may be comprised of a housing containing an orifice variably closeable by a threaded needle or spool valve reciprocating within a threaded bore, or of a rotating barrel valve, all of which may be actuated by an electronic stepper motor. Valve 45 if of a reciprocating spool or needle configuration, may alternately be actuated by a linear motor.

Figure 1A:
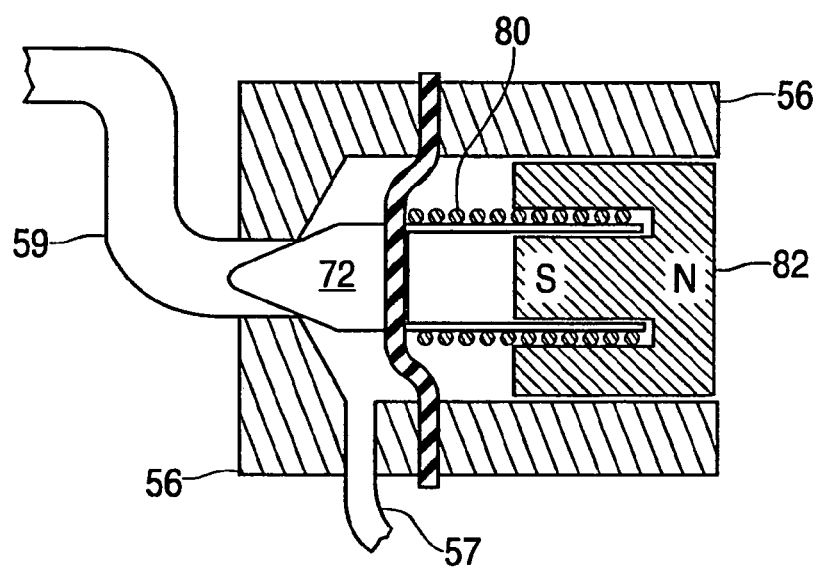
FIG. 1a is a voice coil actuated iteration of the electromagnetic liquid fuel pressure regulator 56 shown in FIG. 1

Electromagnetic petrol regulator 56 communicating through pipe 57, rail 30 and fuel lines 5 and 9, may control hydraulic fuel pressure to both injectors 28, and selectively to upstream hydraulic amp chamber 40 through solenoid valve 11. Regulator at 56 variably reciprocates valve head 72 by means of an attached armature 62 actuated by a surrounding coil as depicted, or may alternately actuate valve 72 by means of an attached voice coil moveable within a magnetic field as seen in FIG. 1a. A single variable pressure regulator of sufficient dynamic range at 56 can thus obviate the requirement for separate parallel servo circuit components 45 and 47.

Restating the basic control principal of the invention, variable servo pressure within amp pressure chamber 40 may be regulated by varying the speed and output of pump 7 through electric or engine driven means, and/or by varying the flow capacity of variable valve 45, and/or by electrically modulating the movement of valve 72 within electromagnetic regulator 56. Backpressure generated by these components is sensed within amp pressure chamber 40 and amplified by virtue of the relatively large diameter of crown 35 of piston-pushrod structure 34, versus the smaller diameter of regulator sensing piston 16. Regulator piston 16, sensing the amplified force of pressure chamber 40 acting through structure 34, and the opposing force from regulator output chamber 19, variably reciprocates connected flow control valve 14 upon orifice seat 15 to deliver a servo controlled variable gas pressure supply to injector rail 20.

Bi-Fuel and Dual-Fuel Modes

Referencing FIG. 1, in petrol fuel only mode solenoid valve 11 within pipe 9 is closed, allowing hydraulic pressure within amp pressure chamber 40 to bleed down through weep line 49 and/or through the communicating, downstream parallel servo circuit components communicating with pipe 43. Depressurized chamber 40 then allows gas pressure within regulator pressure sensing chamber 19 to move regulator sensing piston 16 and connected flow control valve 14 upward against valve seat 15, closing off orifice 21 blocking gas flow from pipe 6 through pipe 18 to downstream gas injectors 22. Injectors 22 may be deactivated by ECU 31. Petrol injectors 28 then operate with fuel supplied by fuel pump 7 through fuel line 5 and rail 30, controlled by pressure regulator 56.

In a gaseous fuel only mode, petrol injectors 28 are deactivated by ECU 31 while solenoid valve 11 is energized, opening conduit 9 to allow variable hydraulic pressure to communicate with amp chamber 40 Pressure regulated gas from chamber 19 then flows through pipe 18 and rail 20 to gas injectors 22, activated by ECU 31. In a supercharged "dual-fuel" application, gas and liquid fuels may be injected simultaneously within throttle body 24, as where a heat absorbing fuel such as methanol may be variably utilized with a gaseous fuel to cool the inlet fuel-air mix in order to reduce detonation and add power. This may be accomplished by selectively activating liquid injectors 28 in response to boosted air charge pressures, while gas injectors 22 and solenoid valve 11 remain continuously operative to supply the main gaseous fuel charge. Diesel dual-fuel operation employing a diesel fuel pilot charge injected into the cylinders as an ignition source, with the main gaseous fuel injected into the inlet air at throttle body 24, can be accomplished by utilizing pump 7 as a lift pump to feed a high pressure diesel fuel injection pump and injectors (not shown) through fuel line 5, while simultaneously utilizing all of the variable hydraulic servo components of the present embodiment to deliver a variable pressure fuel supply to gas injectors 22.

Throttle by Wire

ECU 31 may receive fuel demand signals from sensors (not shown) that measure engine speed, and from sensors within throttle body 24 that measure manifold pressure, inlet air mass flow and temperature. Fuel tank quantity may be determined by ECU 31 from signals received from pressure/temperature sensor 23 within gas pipe 6. Sensor 23 output can also be used for feed-forward circuitry to compensate for increased regulator output pressure that can occur with declining tank pressure. Sensor 25 located on gas rail 20, supplies ECU 31 with pressure and temperature signals to control injector operating pulse widths, and to calculate variable supply voltages for pump 7, valve 45 and electric regulator 56 in order to maintain variable gas pressure in rail 20 for optimal injector performance.

ECU 31, receiving power demand input from an operator controlled "gas pedal" may control engine output by variably controlling gas injector rail pressure through modulation of hydraulic servo components pump 7, valve 45 and/or electromagnetic regulator 56. Variable servo pressure thereby produced variably actuates hydraulic amp 32 to produce in an amplified variable gas injector rail pressure from regulator 10. Pneumatic actuator 33 or a throttle motor powered by ECU 31 then regulates inlet air flow via throttle valves 29 in response to variable fuel pressure to produce an optimum air/fuel ratio.

Safety

Referencing FIG. 1 and FIG. 2, diaphragm 42 is clamped between the upper 1 and lower 3 halves of hydraulic amp 32, and primarily serves to seal hydraulic servo pressure within chamber 40. Annular space 44 surrounding piston-pushrod 34 is vented to a suitable place outside of the vehicle through communicating vent conduit 17. Vent 17 with appropriate connected piping, serves to direct fuel to a safe area should diaphragm 42 or pressure sensing piston 16 within gas regulator 10 leak. In FIG. 1, diaphragm 42 is held against the periphery of piston crown 35 of piston-pushrod 34 by attached retaining ring 41, represented here in cross section. Should high pressure gas from regulator 10 leak past regulator piston 16 and structure 34 into annular space 44, excess pressure in space 44 will force structure 34 upward with diaphragm 42 and ring 41 to block orifices 52 and 48, preventing the ingress of gas into chamber 40 and the communicating vehicle fuel system. This possibility is reduced by the venting function of conduit 17.

Referencing FIG. 2, the function of retaining ring 41 may be supplanted by plate 64 which secures diaphragm 42 to crown 35 of piston-pushrod 34 with bolt 68. Air pockets within chamber 40 can rise and exit through orifice 52, eliminating the need for orifice 48 and weep line 49 shown in FIG. 1. A high pressure leak from regulator 10 into to space 44 will force piston-pushrod 34 upward with diaphragm 42, causing the top surface 70 of bolt 68 to contact seating surface 50 surrounding orifice 52, blocking the ingress of high pressure gas into chamber 40 and the communicating vehicle fuel system. In FIG. 2, sealing diaphragm 42 and diaphragm retaining plate 64 may be replaced with an O-ring contacting the inner wall of amp 32 positioned within an annular groove machined into the side of crown 35 (not shown), in order to seal hydraulic servo pressure within chamber 40. Bolt 68 or a convex valve head means (not shown) formed at the apex of crown 35 may block orifice 52 in the event that a high pressure gas leak from regulator 10 forces structure 34 upward against orifice 52.

The invention claimed is:

1. A variable pressure gaseous fuel supply system for an engine capable of burning liquid and gaseous fuels individually or simultaneously comprising:
   (a) a source of fuels such as natural gas and hydrogen pressurized to approximately 200 psi or higher piped to;
   (b) a variable gaseous fuel pressure regulator incorporating;
   (c) an attached hydraulically amplifying servo actuator henceforth referred to as a hydraulic amp which contains a hydraulic pressure sensing chamber variably pressurized through an orifice in said hydraulic amp communicating with;
   (d) a variable pressure hydraulic servo pressure circuit wherein;
   (e) pressurized hydraulic servo fluid is isolated from yet mechanically communicable with the load governing side of the gaseous fuel pressure regulator's internal pressure sensing element, such that the hydraulic fluid is sealed by a sealing structure within said hydraulic pressure sensing chamber and which in turn acts against a hydraulic pressure sensing crown surface of a piston-pushrod structure reciprocable within said hydraulic amp that in turn contacts and transmits variable force to said gas regulator's pressure sensing element, and connected flow control valve by said piston-pushrod structure contained within said attached hydraulic amp, said piston-pushrod having at one end a relatively large pressure sensing piston crown communicating with said hydraulic pressure sensing chamber, and at the opposite end a relatively smaller surface that abuts and transmits variable hydraulic servo pressure to said gaseous fuel pressure regulator's internal pressure sensing element and connected flow control valve, whereby said larger diameter piston crown of said piston-pushrod amplifies the pressure of the hydraulic servo fluid against the abutting smaller diameter regulator sensing element, thereby producing a proportionately a higher, variable pressure fuel flow from the gaseous pressure regulator.

2. The variable pressure gaseous fuel supply system of claim 1, wherein pressurized hydraulic fluid for said variable hydraulic servo pressure circuit emanates from a communicating liquid supply.

3. The variable pressure gaseous fuel supply system of claim 1, wherein a flexible diaphragm is positioned between said hydraulic pressure sensing chamber and said pressure sensing piston crown of said piston-pushrod within said hydraulic amp, whereby said diaphragm abuts and transmits pressure to said piston crown while sealing hydraulic servo fluid within said hydraulic pressure sensing chamber.

4. The variable pressure gaseous fuel supply system of claim 1, wherein said piston-pushrod is comprised of aluminum, or of a suitably reinforced plastic or carbon composite material.

5. The variable pressure gaseous fuel supply system of claim 1, wherein the output pressure of the gaseous regulator is multiplied by a factor approximating the ratio of the diameter of the larger area of said piston crown of said piston-pushrod to the diameter of the smaller area of the gaseous regulator's abutting pressure sensing element.

6. The variable pressure gaseous fuel supply system of claim 3, whereby said flexible diaphragm acts to block off and seal one or more orifices in said sensing chamber of said amp communicating with said hydraulic servo pressure circuit, in the event gas leaking from the attached gaseous fuel pressure regulator acts to push said piston pushrod and said diaphragm up against said orifices.

7. The variable pressure gaseous fuel supply system of claim 1, wherein said variable hydraulic servo pressure circuit comprises a liquid fuel supply system for either a bi-fuel engine application where liquid fuel is utilized alternately with a gaseous fuel, or a duel fuel engine application where liquid fuel is combusted simultaneously with a gaseous fuel.

8. The variable pressure gaseous fuel supply system of claim 7, wherein the hydraulic fluid within said variable hydraulic servo pressure circuit is comprised of alcohol or an alcohol solution to be selectively injected simultaneously with a gaseous fuel for the purpose of reducing uncontrolled combustion or engine knock, especially in supercharged engines.

9. The variable pressure gaseous fuel supply system of claim 7, wherein variable pressure for said variable hydraulic servo pressure circuit and resultant variable gaseous regulator pressure output is controlled by one or more of the following hydraulic flow control components: an electric or engine driven variable flow fuel pump; an electric or mechanically adjustable variable flow valve, and a liquid fuel pressure regulator.

10. The variable pressure gaseous fuel supply system of claim 9, wherein the variable flow fuel pump, the variable flow valve and the liquid fuel pressure regulator are each singularly or in combination controlled by an engine control unit (ECU) responsive to one or more sensed fuel demand parameters such as speed, intake air mass flow and intake manifold air pressure.

11. The variable pressure gaseous fuel supply system of claim 9, whereby the hydraulic servo pressure circuit flow control components control power output by modulating servo pressure, and resulting gaseous regulator output and fuel rail pressure, wherein optimum air-fuel ratios are obtained by an air inlet throttle valve that regulates inlet air flow in response to gaseous fuel rail pressure.

12. The variable pressure gaseous fuel supply system of claim 9, wherein the hydraulic servo pressure circuit flow controlling functions of said electric or engine driven variable flow fuel pump, said electric or mechanically adjustable variable flow valve and said liquid fuel pressure regulator are supplanted by an electromagnetically actuated, ECU controlled variable pressure liquid fuel pressure regulator of sufficient dynamic pressure range capable of producing the required variable hydraulic servo pressure for variable rail pressure gaseous engine operation, as well as the required pressure for liquid fuel operation.

13. The variable pressure gaseous fuel supply system of claim 12, wherein said electromagnetically actuated liquid fuel pressure regulator contains a flow control valve actuated by an attached armature reciprocating within a magnetic field generated by a surrounding coil.

14. The variable pressure gaseous fuel supply system of claim 1, wherein a convex bolt head attached to the apex of said piston crown of said piston pushrod is closeable on said orifice communicating between said hydraulic servo pressure circuit and said hydraulic pressure sensing chamber, whereby said bolt head acts to block off and seal said orifice in the event gas leaking from said attached gaseous fuel pressure regulator forces said piston pushrod and said bolt head up against said orifice.

* * * * *